Nov. 11, 1941.　　　　W. R. DRAY　　　　2,262,453

HARVESTER-THRESHER

Filed July 1, 1935　　　　4 Sheets-Sheet 1

Inventor
W. R. Dray
by
Attorney

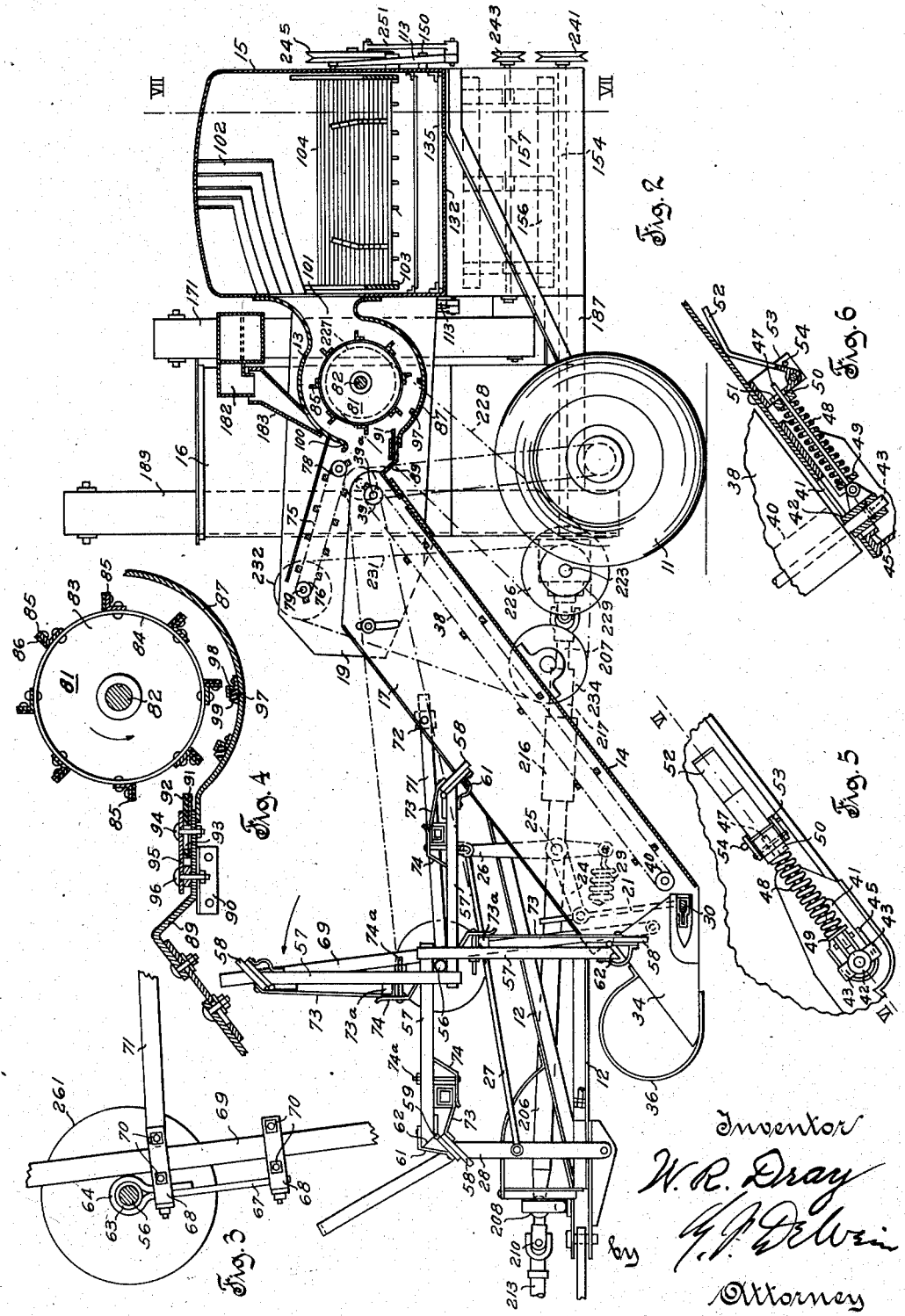

Nov. 11, 1941.  W. R. DRAY  2,262,453
HARVESTER-THRESHER
Filed July 1, 1935  4 Sheets-Sheet 3
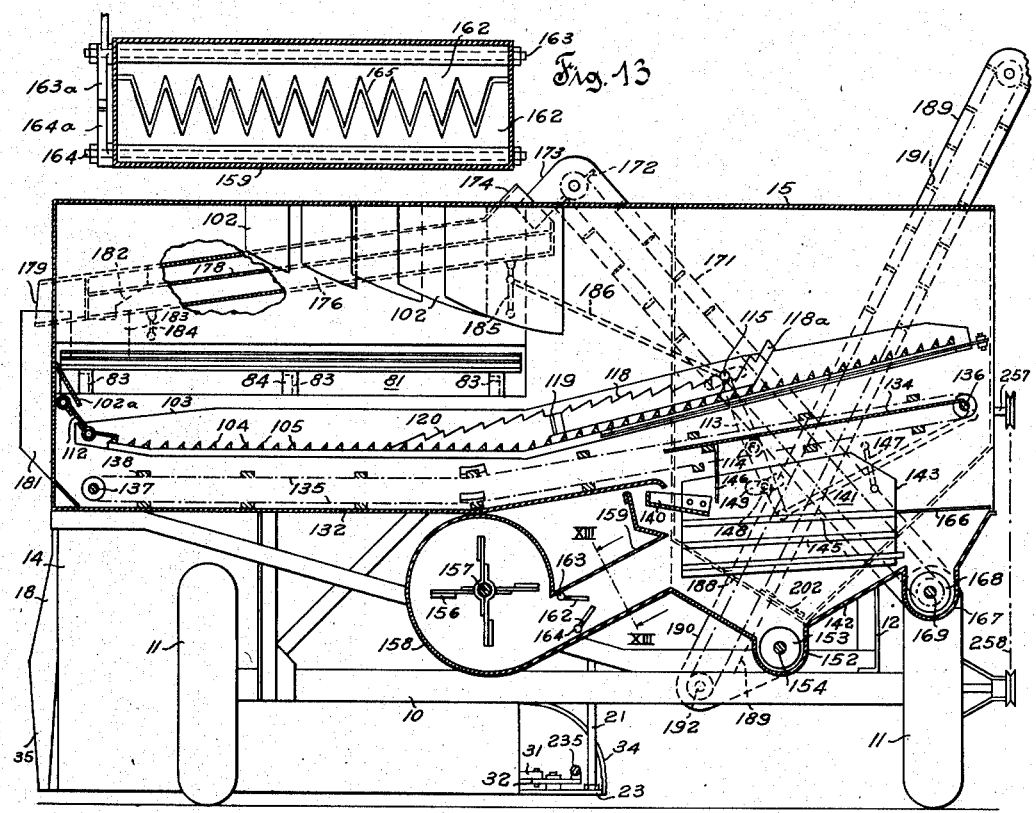
Fig. 13
Fig. 7
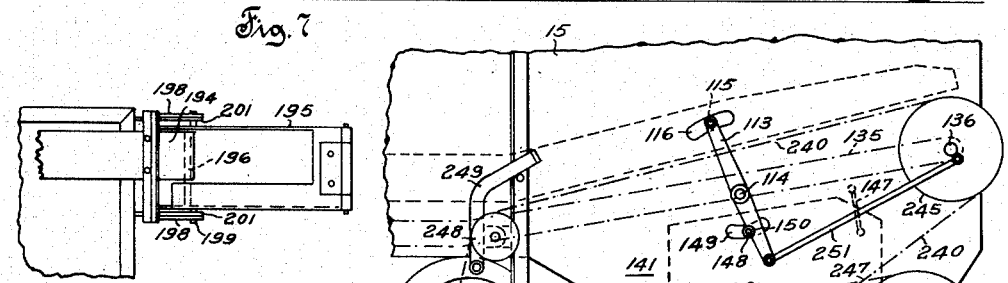
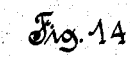
Fig. 14
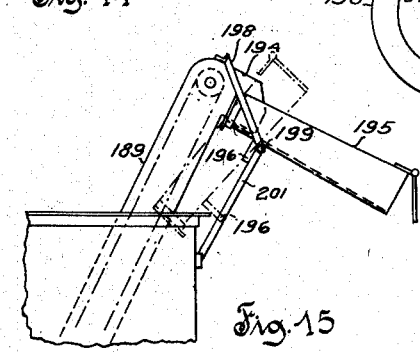
Fig. 8
Fig. 15
Inventor
W. R. Dray
by
Attorney Nov. 11, 1941.    W. R. DRAY    2,262,453
HARVESTER-THRESHER
Filed July 1, 1935    4 Sheets-Sheet 4
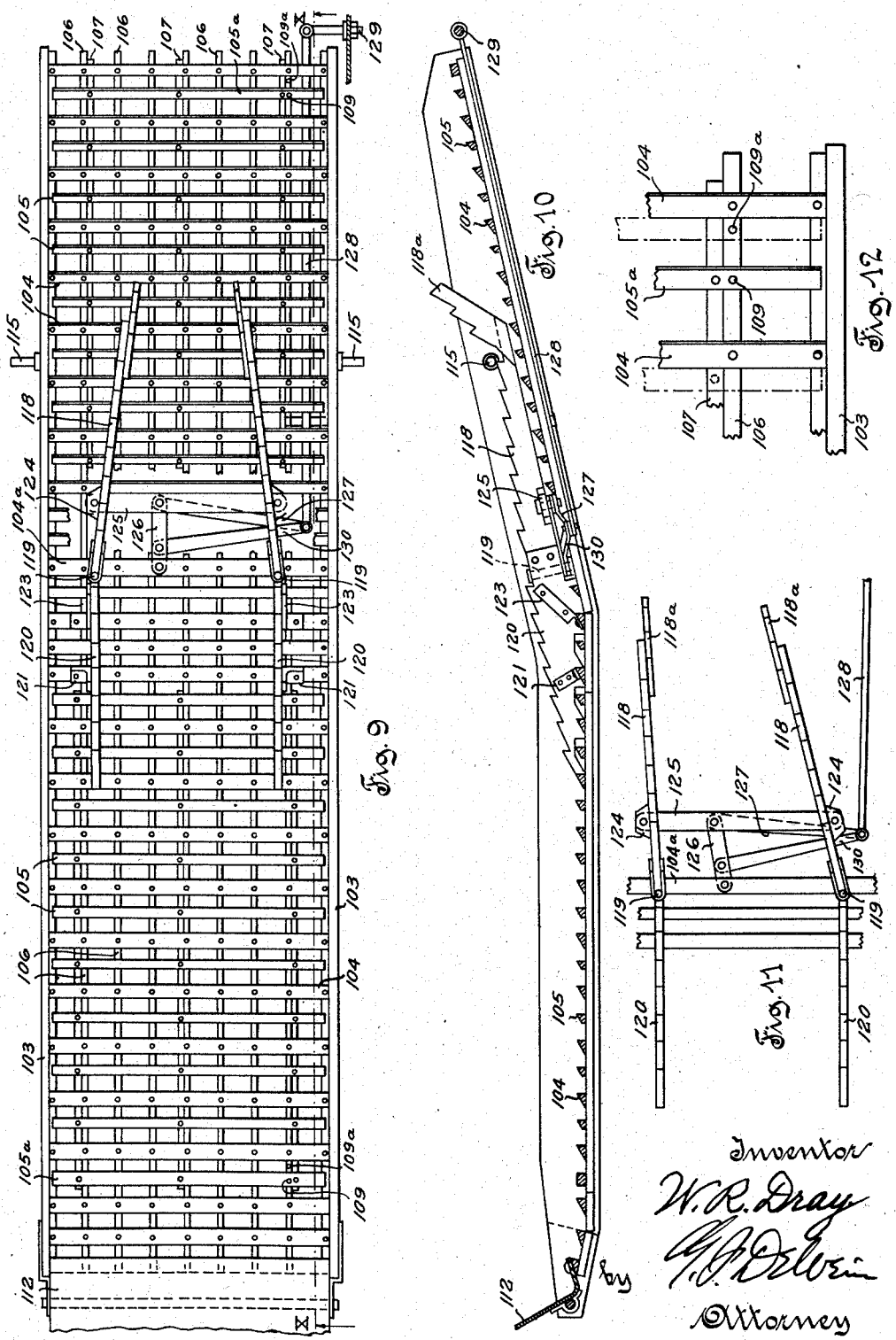

Patented Nov. 11, 1941

2,262,453

UNITED STATES PATENT OFFICE 2,262,453

HARVESTER-THRESHER

Walter R. Dray, La Porte, Ind., assignor to Allis-Chalmers Manufacturing Company, Milwaukee, Wis., a corporation of Delaware Application July 1, 1935, Serial No. 29,216

9 Claims. (Cl. 130—27)

This invention relates in general to improvements in threshing machines, especially machines of the class wherein the mechanism for harvesting grain or the like crops is combined in a single apparatus with the mechanism for threshing and separating the threshed grain or the like from the straw or stalks or from foreign material. Machines of this class are generally known as harvester-threshers or combine harvesters or combines.

A feature which has militated strongly against the more general use of threshing machinery, particularly of the combine harvester type, of the heretofore known commercial classes, is the fact that those machines which have been effective to do a reasonably satisfactory job in the harvesting, threshing and separating of grain, have been quite cumbersome and expensive and beyond the financial resources of many farmers who might willingly adopt a simpler and less expensive machine of satisfactory capacity and capable of efficiently producing relatively clean grain from the crop to be harvested.

It is the general object of the present invention to provide improved threshing machinery, more particularly of the combine harvester type which is capable of handling a wide variety of crops with great capacity and efficiency in the matter of cutting and threshing the crop and producing therefrom clean grain or seed, and which is of such relatively small weight and size and low power requirements as to permit being manufactured at a low cost, and its harvesting travel across a field and its efficient operation at high speed to be effected by a relatively small tractor.

It is a further object of this invention to provide a harvester-thresher of simple and relatively inexpensive design and construction embodying improvements in the harvesting and threshing mechanisms and in the separating mechanism wherein the material discharged from the threshing mechanism is effectively guided into and along a separating path of extended length, and preferably extending transversely of the direction of travel of the machine during normal operation thereof, and including improved devices for effectively guiding material discharged from the threshing mechanism into the separating path in a manner to insure efficient utilization of the full length of the separating path.

These and other objects and advantages are attained by the present invention, various novel features of which will be apparent from the description and accompanying drawings, disclosing an embodiment of the several features of the invention, and will be more particularly pointed out in the claims.

Further particular objects and advantages of features of the invention disclosed but not claimed in this application are more particularly set forth in divisional applications specifically identified hereinafter.

While the features and operation of apparatus embodying the present invention are more particularly described hereinafter in connection with the harvesting, threshing and separating of grain, the apparatus is also particularly well adapted for like operations on various bean, seed and like crops.

In the accompanying drawings:

Fig. 2 is a sectional view in the plane of the line II—II of Fig. 1.

Fig. 3 is a view in side elevation of a detail of the reel supporting mechanism.

Fig. 4 is an enlarged sectional view, in the plane of the lines II—II of Fig. 1, of details of the threshing mechanism.

Fig. 5 is a view in elevation of details of the mounting of the lower roll of the main feed conveyer or draper.

Fig. 6 is a sectional view, in the plane of the line VI—VI of Fig. 5.

Fig. 7 is a sectional view in the plane of the lin. VII—VII of Fig. 2.

Fig. 8 is a view in elevation of a portion of the rear side of the apparatus.

Fig. 9 is a plan view, with parts broken away, of the separating mechanism of the apparatus.

Fig. 10 is a sectional view in the plane of the line X—X of Fig. 9.

Fig. 11 is a plan view of details of the actuating mechanism shown in Figs. 9 and 10, in one extreme position.

Fig. 12 is an enlarged plan view of a detail of Fig. 9.

Fig. 13 is a sectional view, in the plane of the line XIII—XIII, of Fig. 7.

Fig. 14 is a plan view showing details of the discharge associated with the elevator and storage bin.

Fig. 15 is a view in rear elevation of the parts shown in Fig. 14.

Fig. 16 is an enlarged plan view of a detail shown in Fig. 1.

Figs. 17 and 18 are sectional views in the planes of the lines XVII—XVII and XVIII—XVIII respectively of Fig. 16.

Figure 1:
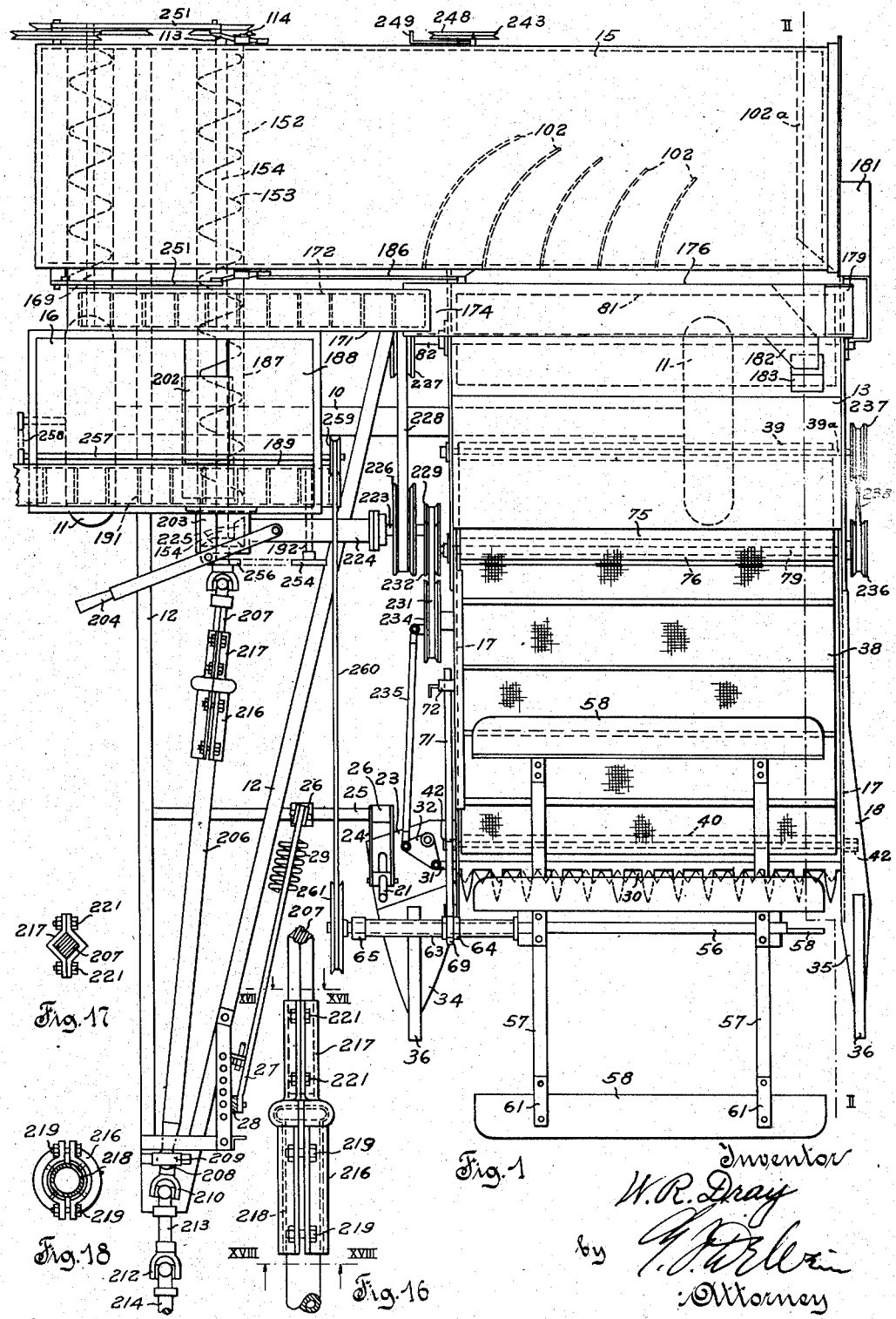
Fig. 1 is a plan view of a harvester-thresher or combine embodying features of the present invention.
Figure 17:
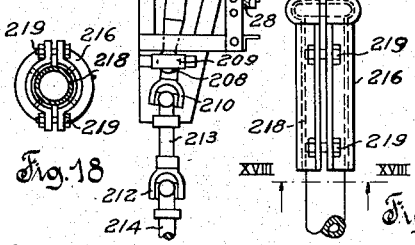

Referring to the drawings, a main support for the apparatus may be in the form of a steel tube 10 carrying journals for the supporting and traction wheels 11 and extending transversely of the normal direction of travel of the apparatus. On this tubular support 10 is mounted an auxiliary supporting structure of a fabricated character and including a forwardly projecting fabricated frame 12 serving as a drawbar support through which tractive effort of a source of traction, such as a power tractor, may be applied through a suitable coupling at the foward end of the frame 12, and as a support for a power shaft through which power is supplied from a tractor for operating the several mechanisms of the apparatus, and a framework on which are carried several major elements of the apparatus, such as the supporting and enclosing housing 13 for the threshing mechanism, with the auxiliary header frame 14 carried by the latter housing, and the separator housing 15 communicating with the discharge side of the housing 13 for the threshing mechanism and extending transversely thereof and likewise transversely of the direction of travel of the harvester-thresher during normal operation thereof, and a storage bin 16 for clean grain. The position of the traction wheels and their journals is such that the weight of the harvester-thresher is balanced about the axis of rotation of these wheels.

The header frame 14 is of trough like form open at its forward and rear ends and has side walls 17 which may be flanged at their upper edges throughout the major portion of their length, the flange 18 on the outer side wall being of tapering curvature and acting as a guide to deposit cut grain on the header frame. The side walls 17 of the header frame fit closely within side walls 19 of the housing 13 for the threshing mechanism at the open forward side thereof, and the header frame is mounted on the housing 13 through a pivotal connection between the side walls of the header frame and the side walls of the housing 13, so that the lower forward edge of the header frame may be swung upward and downward to a desired position of adjustment relative to the ground.

The header frame may be actuated to desired position of adjustment relative to the ground by means of a rod 21, preferably pivotally attached at its lower end to a laterally extending flange or plate 23 integral with or secured to the inner side wall 17 of the header frame, and this rod is attached at its upper end to an arm 24 carried by a rod 25 pivotally mounted on the drawbar frame 12. Attached to the rod 12 is an actuating arm 26 which is attached to an actuating rod 27, the latter reaching to a suitable lever mechanism 28 of conventional form carried at the forward end of the drawbar frame, a balancing spring 29, shown as attached to a reverse extension of the actuating arm 26 and to the frame 12, preferably being provided to counterbalance the header frame.

At the forward end of the header frame 14 adjacent the bottom plate thereof is mounted a sickle device 30 of conventional design, as in the form of relatively movable cooperative operative cutting knives, and an actuating rod 31 for said sickle device is pivotally attached to an actuating plate 32 pivotally mounted on the laterally extending plate 23 carried by the inner side wall of the header frame.

A shield or guard 34 of generally rounded and forwardly tapering shape and open at its rear side is attached to the lower end of the inner side wall 17 of the header frame and the plate 23, and serves to protect operating mechanism, such as the header frame actuating rod 21 and sickle actuating plate 32, at the rear of the guard, and also serves to guide grain toward the sickle and header frame. The outer side wall of the header frame is extended, by an integral portion or separately secured element, in advance of the inner side wall of this frame, the upper edges, particularly the upper edge of this extended side wall being provided with a curved and forwardly tapering flange, as indicated at 35, the structure forming a relatively smooth surface splitter which enters the standing grain and serves to lift and gather fallen grain and move the same toward the sickle. The guard 34 and the splitter 35 may be supplemented by a curved upwardly rising guard ring 36 secured to the guard and splitter.

Mounted within the header frame adjacent the lower edges of the side walls thereof is a traveling conveyer 38 of the draper belt type, preferably provided on its outer or working surface with cross bars or strips serving to catch and hold loose grain. This belt is of a width equal to substantially the full length of the sickle device, and it travels over a driving roller 39 having shaft journals rotatably mounted in bearings on the side walls 17 of the header frame near the upper end thereof and on the adjacent portions of the side walls 19 of the housing 13, the driving shaft of this upper roller preferably being coincident with the axis on which the header frame has its pivotal movement on the side walls of the housing 13. This driving shaft, indicated at 39a, projects through the outer side wall 19 of the housing 13.

The lower or foot roller 40 about which the draper 38 travels, has shaft extensions projecting through elongated apertures 41 in the side walls 17 of the header frame and is rotatable in adjustable bearings 42 having guide or positioning wings 43 cooperating with guide walls or flanges 45 formed on the side walls 17 or a plate secured thereto, these flanges serving to guide or confine the bearings in their movement in the general direction of the draper. A rod 47 is attached, preferably with some pivotal movement permitted, to the rear side of each bearing 42 and serves to position a compression spring 48 surrounding the rod and abutting a collar 49 secured on and adjacent the lower end of the rod. A collar 50, loose on the rod 49, is provided as an abutment or bearing for the upper end of the spring 48. A releasable stop 51, attached to an operating arm 52, is pivotally mounted in the side arms of a U-shaped bracket 53 secured to each side wall 17. A removable latch or pin 54 passing through the arms 52 of the bracket 53 cooperates with the operating arm of the stop 51 to hold the latter in set position wherein the spring is held under normal desired compression. Through this arrangement, a desired degree of tension on the belt 38 is maintained in spite of variable weather conditions. When the apparatus is to be out of operation for an extended period, tension on the draper belt may be fully relieved by actuating the stop 51, through its operating arm 52 after removal of the latch or pin 54, to fully released position, thus permitting the lower roller 40 to assume a position wherein there is no tension on the draper belt, thus preserving the useful life of the latter.

Features of the hereinabove described yieldable mounting of the conveyer or feed draper 38 form subject matter of claims of applicant's divisional application Serial No. 343,124, filed June 29, 1940.

A rotatable gathering reel is mounted on the header frame in operative position relative to the sickle and the traveling draper. This reel includes a rotatable shaft 56 and a pair of spaced sets of reel arms, each set including four arms 57 disposed ninety degrees apart and suitably attached to the shaft 56 for rotation therewith. A paddle or bat 58 is pivotally connected or hinged to the two corresponding arms 57 of the two sets, at their outer ends and along the forward edges of the arms, as indicated at 59. This hinged arrangement permits the paddles or bats to swing forwardly with respect to the reel arms in the direction of rotation of the reel as the arms pass forwardly beyond their uppermost position, and to swing rearwardly with respect to the arms as the latter pass beyond their lowermost position, the paddles being restrained in their swinging movement forwardly with respect to the reel arms by flexible inextensible straps 61 attached to the paddles and the supporting arms. The paddles are restrained in their rearward swinging movement by reason of their being pivoted at the forward edge of the reel arms and their cooperation with the beveled ends, indicated at 62, of the arms. This restraining means permits each paddle to swing, due to its own weight, to an angle of approximately thirty degrees forwardly and rearwardly of the plane of the supporting pair of arms for such paddle.

The reel shaft is rotatably supported on an extended bearing or a plurality of spaced bearings in an elongated tubular supporting housing 63. This supporting housing is mounted so as to be capable of up and down and forward and rearward movement, so as to permit any desired positioning of the reel with respect to the sickle. As indicated, the bearing housing 63 is mounted in two spaced strap like brackets 64, 65 carried by a supporting frame which includes a generally vertically extending member 67. Two U-shaped brackets 68 have their cross bars secured to the member 67, and their arms extending rearwardly and embracing the latter member and a generally vertical rod 69 pivotally secured at its lower end to the adjacent side wall 17 of the header frame or the laterally extending plate 23 thereon. The U-shaped brackets 68 and the reel support carried thereby are adjustable up and down on the rod 69, and these brackets have cross bolts, indicated at 70, preferably one at each side of the rod 69; and these bolts may be tightened to cause the side arms of the brackets to frictionally grip the rod 69 and hold the brackets and the reel structure carried thereby in any desired position of adjustment on the rod 69, to thereby position the reel carried thereby at any desired height above the sickle.

An actuating rod 71 is secured by one of the clamping bolts 70 between the rear end portions of the upper bracket 68 and extends rearwardly to a U-shaped supporting bracket 72 in which this rod 71 may be clamped in any desired position of longitudinal adjustment. With the clamping bracket 72 in released condition, the rod 71 may be moved from the position of Figs. 2 and 3, and the support 63 and the reel carried thereby may be shifted to any desired position of adjustment.

It will be apparent that through the adjustable supporting arrangement described, the reel may be shifted up and down and forward and rearward to and maintained in any desired position of adjustment relative to the sickle.

Extending between each pair of supporting reel arms supporting a paddle 58 is arranged an adjustable or removable barrier, in the form of a flexible curtain 73 of canvas or the like. The radially outer end of this curtain is attached to the paddle 58 and the inner end is preferably secured to a rod 73a on which this end of the curtain may be rolled to a desired extent. Removable clamps 74 having one arm braced against the reel arm and the other arm gripping the rod 73a and the portion of the curtain rolled thereon, in conjunction with the clamping bolts 74a passing through the reel arms, serve to hold the inner end of the curtain in fully extended or substantially fully or partially withdrawn condition, according to the predetermined position on the reel arms at which the clamps 74 are secured. This arrangement serves to permit or provide any desired degree of opening between the reel arms. Under ordinary operating conditions, the curtains are fully extended, closing the openings between the reel arms and thus preventing bent grain heads from hooking over the inner edges of the paddles and being carried around the reel. During operation on a windy day, the curtains may be rolled back to a desired extent and clamped in partially or substantially fully withdrawn condition, to overcome adverse effects of the wind on the reel.

In the operation of the reel, the reel arms and pivoted bars or paddles carried thereby move in an anti-clockwise direction, considering Fig. 2 of the drawings. As the paddles move forwardly of their supporting arms, due to gravity, the paddles are effective to enter or nose into the standing grain, with minimum tendency to bend over or break off the heads, as compared with the effect of rigid paddles extending substantially in the planes of their supporting arms. And as the paddles are carried to their lowermost position, the grain is carried or urged forward by the paddles and presented to the sickle and the cut grain deposited on the conveying draper, all with a yielding pressure which minimizes breakage of stalks and loosening grain from the heads. As the reel arms move upwardly, the paddles drop behind the arms, due to gravity, and occupy an angular position with respect to the arms, wherein they serve better as a barrier or baffle, due to their angular position with respect to the supporting arms, to prevent cut grain from being thrown or carried upwardly over the edges of the paddles, than if the paddles were disposed substantially in the planes of the arms.

Features of the hereinabove described gathering reel and provisions for operating the same form subject matter of claims of applicant's divisional application Serial No. 343,123, filed June 29, 1940.

An endless feeding conveyor 75, in the form of a draper belt preferably provided with transverse bars or slats on the working surface thereof, is driven by a driving roller 76 and travels over a second roller 78 disposed above and somewhat beyond the upper roller 39 of the conveying draper 38. Shaft extensions of the rollers 76 and 78 are mounted in bearings in the side walls 19 of the housing 13, the shaft 79 of the driving roller 76 passing to the outer side of the outer side wall 19 of the housing 13. The rollers 76 and 78 are so positioned and the feeding draper 75 is so driven that the lower course of the latter draper travels, like the upper course of the conveying draper 38, toward the threshing mechanism in the housing 13, and the working surfaces of the two drapers gradually approaching each other to produce a throat or restricted area over the upper roll 39 of the draper 38. The lower surface of the draper 75, particularly at its inner end, is adapted to press against and advance material which has been fed along and by the working surfaces of the draper 38.

The threshing cylinder, indicated generally at 81, comprises an operating shaft 82 and a plurality of spaced annular members or disks 83 mounted thereon, with the peripheral flanges of the disks turned over at right angles to the planes of the disks, as indicated at 84. Secured to the peripheral flanges 84 of the disks 83 are a plurality of spaced thresher bars 85 in the form of sections of angle iron, one flange portion of each bar being secured to the flanges 84 and the other substantially radially extending flange portions serving as active threshing elements. For a purpose that will be more particularly referred to hereafter, the leading faces of the thresher bars are provided with a wearing surface of relatively flexible rubber or like resilient material, as indicated at 86, vulcanized or otherwise attached to the bars.

The stationary concave element with which the thresher bars cooperate in the threshing operation includes a generally circular and preferably imperforate housing portion 87 beneath the threshing cylinder and a throat or ledger plate assembly at the forward edge of this housing portion, this assembly comprising a bent plate 89 having a portion adjustably mounted on the bottom wall of the header frame and having its rear edge resting on angle plates 90 secured to the side walls 19 of the housing 13 and extending over or in close proximity to the leading edge of the housing portion 87. An adjustable choking or ledger plate 91 is mounted and secured in position at the rear edge of the plate 89, and extends beyond the same toward the threshing cylinder into close proximity to the path of the thresher bars 85. This ledger plate is preferably in the form of a steel plate having a wearing or working surface of rubber or like flexible resilient material 92, riveted, vulcanized, or otherwise secured to the steel plate. The ledger plate may be adjustably secured in position to permit movement of its rear edge toward and from the threshing cylinder, and thus most efficiently accommodating for wear of the rear edge of the ledger plate and for diverse characteristics of various crops to be threshed, particularly as to size or character of the grain kernels or seed and the stalks, by being provided with elongated slots 93 through which pass bolts 94 which, in cooperation with the plate 89 and an upper clamping plate 95 and bolts 96 and a cooperating spacer at the forward edge of this clamping plate, serve to clamp the ledger plate in any desired position of adjustment of its rear edge with respect to the path of the threshing bars.

On the upper surface of the concave housing 87 raised portions or bars or strips 97 are provided, these latter extending generally parallel to the axis of the threshing cylinder and projecting into relatively close proximity to the path of the thresher bars 85. These bars or strips may be in the form of raised portions of the housing or bars secured to the housing and covered at their forward surface, and preferably at the upper surface, with a wearing surface of rubber or like material; but, as shown in the drawings, these bars or strips are preferably in the form of rubber strips secured in place on the housing 87 by angular clamping strips 98 which engage the upper surfaces of the rubber strips and are provided with flanges secured to the housing 87. The leading edges of these concave threshing bars or strips are preferably inclined rearwardly, as indicated at 99, for a purpose which will be referred to hereinafter.

The upper portion of the housing for the threshing cylinder follows and is relatively closely spaced from the path of the threshing bars 85 to a point adjacent the end of the upper feeding draper 75, the forward end of the housing being easily curved, as indicated at 100, and serving to guide grain downwardly toward the ledger plate 91 and the threshing bars moving past the same.

In order to best accommodate the apparatus for threshing various kinds of crops, the bearings for the shaft 82 of the threshing cylinder are mounted, in a conventional manner, so as to be adjustable toward and from the active threshing portions of the concave. With such an arrangement, the space between the path of travel of the radially outer edges of the rotating threshing bars and the radially inner edges of the concave threshing projections may be varied to best facilitate the passage of the threshed grain or seeds and the stalks of the crop.

In the operation of the threshing mechanism, the harvested grain is moved upwardly along the conveying draper 38 toward its discharge end where the feeding draper 75 cooperates in moving the grain toward the threshing mechanism and into the path of travel of the threshing bars 85, and the latter, moving at a relatively high speed, beat the grain kernels from the straw and force or draw the threshed grain and straw between the threshing bars and the rear edge of the ledger plate. During this operation, the heads of grain are forcibly projected against the rear edge of the ledger plate and then carried beyond the same by the rotating threshing bars, the latter carrying the grain and straw past the threshing bars and the concave, the cooperative movable and fixed threshing bars serving to beat the grain from the heads as the latter and the straw are passed through the space between the cylinder and the concave.

Due to the fact that there is considerable fan action of the rapidly rotating threshing cylinder, particularly through the threshing bars acting as fan vanes, a considerable current of air is induced along the normal path of flow of material passing through the threshing mechanism, and this induced draft assists in forcing the straw and threshed grain from the housing of the threshing cylinder toward and rearwardly and upwardly through the discharge therefrom into the separator housing 15.

It is a recognized fact that the efficiency of the threshing operation is ordinarily increased with the speed of operation of the threshing cylinder; but it is also recognized that increase in the speed of the threshing cylinder beyond a certain point causes damage to the threshed grain, particularly in the matter of cracking the same; and this defect is probably more apparent in the threshing of crops other than grain, as for instance, beans. This cracking results in great part from the fact that the kernels or seeds are thrown or batted by the movable threshing bars against the concave with very considerable force. The advantages of high speed of the threshing mechanism and efficient operation under high speeds of the threshing cylinder are attained by means which are intimately concerned with the provision of the rubber or like wearing surfaces on the leading faces of the rotatable threshing bars and the ledger plate and threshing projections of the concave. With the provision of these flexible and resilient surfaces, the grain kernels or seeds, when struck by the movable threshing bars, are thrown by the latter against the ledger plate and the threshing projections of the concave from which they rebound with great force into the path of succeeding threshing bars, the inclined forward faces 99 on the fixed threshing elements of the concave facilitating this action; and the general effect is to secure a very thorough separation of the grain from the stalks in the threshing mechanism, and all without any serious damage to the grain kernels or seeds from the impingement upon the active surfaces of the threshing elements, even under high operating speeds.

Features of the hereinabove described threshing mechanism form subject matter of claims of applicant's divisional application Serial No. 343,127, filed June 29, 1940.

The discharge opening or passage 101 from the housing of the threshing cylinder extends across the full width of the cylinder and opens into the forward portion of the rearwardly disposed separator housing 15 through the adjacent wall thereof, the separator housing extending across the full width of the threshing mechanism and laterally beyond the same. This discharge passage is preferably generally above the horizontal plane through the axis of the cylinder; and the straw and grain discharged from the cylinder housing with considerable force, due to the relatively high speed of the cylinder and the fan effect thereof, is blown or forced across the separator housing with a generally upward component and with a tendency to whirl and pile up on the portion of the separating mechanism adjacent the inner edge of the threshing cylinder. This forcible expulsion of material from the threshing cylinder tends to keep the threshing cylinder clear with little tendency to clogging, and it is a desirable feature in efficient threshing. However, in order to maintain the separating mechanism of minimum length and to insure utilization of the separating action of the latter throughout its full length, means are provided for insuring that the straw discharged from the threshing cylinder is deposited on the forward end of the separating mechanism, or that lateral end remote from the discharge end of the separator.

One or more guiding baffles 102 curving toward the forward end of the separator housing are mounted on and depend from the roof of the separator housing into the path of material projected upwardly from the discharge from the threshing cylinder. These baffles 102 preferably extend to gradually increasing distances transversely of the separating chamber, and may be of gradually increasing height, toward the discharge end of the separator housing, in order to secure the desired baffling and guiding effect. The material discharged from the cylinder housing strikes these baffles and is guided thereby toward the forward end of the separator housing and drops down on the adjacent end portion of the separating mechanism, permitting utilization of the separating action of the latter on the straw throughout the full length of the separator. Due to the fact that the separating mechanism is beneath the direct path of the portion of the air blast of greater pressure during the discharge of material from the threshing cylinder, the straw dropping on the rack is moved along, in a direction transverse to the general direction of discharge of material from the threshing mechanism and likewise transverse to the direction of travel of the harvester-thresher during normal operation thereof, toward the discharge end of the separating mechanism substantially under the influence of the shaking motion of the separating mechanism.

The forward end wall of the separating housing 15 may be provided with a transversely extending baffle 102a extending across substantially the major portion of the width of the housing and extending downwardly at an angle between forty-five degrees and sixty degrees from a horizontal plane. This baffle 102a serves to deflect onto the forward end of the separating mechanism grain and straw particles projected against the forward end wall, thus preventing pieces of straw from passing downwardly between the end of the rack and the adjacent wall of the separator housing. This baffle 102a may be mounted on a portion of this end wall which is hinged or otherwise removably secured in position, so as to permit, on removal of the detachable portion, inspection of the rack and discharge portions of the threshing cylinder housing.

The separator housing 15 is provided with devices for shaking the straw and recovering threshed grain therefrom, these devices including a straw shaking rack extending the full length and approximately the full width of the separator housing. The straw rack includes a frame 103, comprising longitudinal side members and connecting bars at the ends thereof, and is of dimensions approximating the inner dimensions of the separator housing.

This rack is provided with a series of spaced slats extending transversely of the length of the housing and carried by the frame 103. As indicated, these slats are arranged in two series, the slats 104 of one series alternating with the slats 105 of a second series. The slats of the first series are secured to one or another set of spaced longitudinally extending tie bars 106, each set corresponding in position to one of two relatively inclined sections of the rack and are connected at suitable intervals to flanges or projections on the inner side walls of the frame 103, so that these slats, with their tie bars or rods 106, constitute a unitary structure with the frame 103. Slats 105 of the second series may be of somewhat smaller cross section than the slats 104 and are mounted on one or the other series of parallel tie bars 107, the slats of this second series, with the two sets of longitudinally extending bars 107 constituting two slatted frames assembled with the slats 105 disposed in spaces between adjacent slats 104 of the first series and secured to the longitudinal tie bars 107 and resting on the upper sides of the tie bars 106 of the first series of slats.

With this arrangement, it will be apparent that the slats 105 of each of the second series of slats may be moved as a unit relative to the slats 104 of the first series. The desired normal position of the two series of slats is such that slats 105 occupy positions in the middle of the spaces between adjacent slats 104 of the first series, thus providing openings of the same size between the slats of the two series throughout, this arrangement being satisfactory for handling the straw or stalks of most crops.

The several series of slats 104 and 105 may be held in the above described adjusted position by securing one or more slats 105a of both sets of this series to one or more of the tie rods 107 of the other series of slats by means of one or more removable pins or screws 109, as indicated.

While it is desirable to have relatively small openings between adjacent slats of the rack and thus avoid having pieces of straw pass through the rack along with the grain, still, in handling certain crops, particularly such as have relatively large stalks, portions of these stalks are likely to enter the spaces between adjacent slats and to become wedged therein, thus impeding the free flow or advance of straw along the rack and the passage of threshed grain through the openings in the rack. On removal of the securing pins or screws 109, the frames made up of the slats 105 and tie rods 107 may be moved as units to bring the slats 105 toward and into engagement with adjacent slats 104, in which position they may be secured, with the securing pins or screws 109 passing through holes 109a in the tie rods 106, thus providing approximately one-half as many openings through the rack as are indicated in Fig. 11, but these openings being of considerably greater size, thus avoiding any clogging that might result from large stalks that might otherwise become wedged in the smaller openings of the rack.

As indicated, the slats 105 may be omitted at a point intermediate the length of the rack adjacent the intersection of the two relatively inclined sections thereof and also adjacent the forward end of the rack, where this end of the frame is inclined upwardly from the body portion of the rack. At these points, the fixed slats 104 which are definitely positioned with respect to the frame are spaced apart the same distance as the normal spacing of the slats 104 and 105 throughout the body portion of such rack, as indicated in Fig. 9.

The rack is mounted in operative position to provide for the desired oscillating or shaking motion through a link or set of links 112 pivoted to the forward end of the frame 103 and the end wall of the separator housing, and through oscillating shaking arms or levers 113, one at each side of the separator housing, mounted on journal pins 114 carried by the housing. The upper ends of these shaking levers 113 are connected to pins 115 on the outer side walls of the frame 103 and passing through arcuate slots 116 in the side walls of the housing. With the rack mounted or swung on the rear supporting links 112 and the upper ends of the shaking arms 113, the rack as a whole is given the desired vibrating or shaking motion through oscillation of the shaking arms 113.

In order to augment the normal separating action of the straw rack, auxiliary shaking devices are provided, in the form of a plurality of longitudinally extending and spaced shaker arms 118, these arms being disposed above and adjacent the upper surface of the rack slats, and preferably slightly spaced from the latter, the upper edges of these arms being serrated in such fashion as to assist in advancing any straw resting thereon toward the discharge end of the separator housing, and the arms being inclined toward each other in the direction of travel of the straw. The discharge ends of the shaker arms are preferably provided with upwardly extending tail like projections 118a, the raised discharge ends of these projections being considerably spaced from the body of the straw rack so that as the straw is moved over these extensions, it is free to drop through space onto the body of the rack.

These shaker arms 118 have a lateral motion across the rack about pivotal points, in a fashion corresponding to the movement of a fish's tail. As indicated, the shaker arms are pivoted or hinged, as indicated at 119, to the forward edges of bars or arms 120 secured to certain slats or bars 104 carried by the rack frame, as by angle irons 121, 123 secured to a side wall of each bar 120 and to a slat or bar 104 of the rack. The upper edges of these bars 120 are inclined upwardly gradually from the level of the upper surfaces of the rack slats to the level of the rear edge of the upper surface of the shaker arms 118. While each of the shaker arms 118 has its own motion about its pivotal point 119, the two arms are secured together for common movement. This attachment may be through brackets 124 secured to the side of each arm and having a flat plate at its lower side, to each of which at the under side thereof a connecting bar 125 is pivotally attached.

The desired sidewise oscillation of the shaker arms 118 is secured through a linkage utilizing the shaking motion of the rack itself as a power source. A link 126 is pivotally connected to an intermediate point on the connecting bar 125 and to a slat or cross bar 104a of the rack. A link 127 is pivotally connected at one end to the end of the link 126 attached to connecting bar 125 and at its other end to the inner end of a rod 128 extending longitudinally beneath the rack to the discharge end thereof, the other end of the rod 128 being fixed in position as by being attached to a pin 129 definitely secured to the side wall of the separator housing. Another link 130 is secured at one end to an intermediate point of the link 126 and at its other end to the inner end of the rod 128.

As the rack receives oscillating movement longitudinally of its length, the arms 118, the connecting bar 125 and the slat 104a partake of this same movement. However, due to the fact that the inner end of the rod 128 is fixed against longitudinal movement, the ends of the links 127 and 130 which are attached to the rod 128 must remain fixed against longitudinal movement, and the incidental angular motion of the links 127 and 130 about the end of the rod 128 causes the link 126 to move angularly about its point of attachment to the slat 104a. This angular motion of the link 126 causes the connecting bar 125 to move in the general direction of its length and relative to the rack, and thus to oscillate the shaker arms 118 transversely across the rack, in addition to partaking of the normal oscillatory movement of the rack. The required transverse movement of the inner end of the rod 128 to which the links 127 and 130 are attached, may be provided through limited pivotal movement of such rod on its pin 129, or merely through resilience of the rod 128 which is held in position only at its outer end.

In the normal operation of the apparatus, straw and grain threshed therefrom, through the action of the threshing mechanism, are fed or blown by the latter into the separator housing, being deposited upon the forward end thereof. Through the normal shaking action of the rack, this straw and grain are advanced rearwardly along the rack, that is, in the direction of discharge from the separator housing, the grain, along with relatively short pieces of straw falling through the spaces between the rack slats as the straw is advanced. The straw advancing along the rack through the normal oscillatory movement thereof, or at least the greater portion of the straw, will advance or ride upon the serrated upper edges of the supporting bars 120 and the pivoted shaker arms or fish-tails 118. Through this riding up and advancement of the straw along the shaker arms there is less tendency toward matting down of the straw on the rack in such a manner as to impede the passage of threshed grain or seeds through the straw. Further, in addition to lifting the straw mass and rendering it less dense, these shaker arms, through their independent oscillating movement very effectively break up and agitate the straw masses so as to insure a maximum removal and recovery of grain. The straw continues to advance over the pivoted shaker arms and the rack and to the discharge end of the rack, and it is forced over the discharge end directly into the field or is conveyed through a suitable rigid or flexible conveyer to a desired point of discharge.

Features of the hereinabove described straw shaking rack and its operation form subject matter of claims of applicant's divisional application Serial No. 343,125, filed June 29, 1940.

During operation of the straw rack, threshed grain and some chaff dropping through the spaces between the slats 104, 105, fall onto the bottom plate 132 of the separator housing, and onto a plate 134 secured to the side walls of the housing adjacent the discharge end thereof. A grain drag or rake 135 of conventional design is provided within the separator housing below the straw rack, this drag or rake including a pair of endless chains one at each side of the housing and passing over driving sprockets on a driving shaft 136 and over sprockets at the front end of the housing mounted on a shaft 137, with spaced transverse raking bars 138 extending between and connecting the chains.

The sprockets for the grain drag are so disposed relative to the bottom wall 132 of the separator housing and the plate 134 that the upper course of the drag brushes over the upper surface of the plate 134 and the lower course of the drag brushes over the upper surface of the bottom wall 132 of the housing. Hence, grain falling on the plate 134 is carried forwardly along the plate by the movement of the grain drag and drops off the forward edge of the plate, all or a portion falling onto the rear edge of the bottom wall 132 of the housing. And all of the grain falling onto the bottom wall 132 of the housing is carried by the drag to the rear edge of the bottom wall where it is brushed off into a discharge pan or chute 140 whence it is free to discharge by gravity to a fanning or cleaning device 141.

The cleaning device 141 may be of the fanning mill type and is disposed in a housing 142 depending from the separator housing and open to the latter housing below the plate 134. The cleaning device comprises a frame 143 in which is mounted a plurality of superposed and spaced and preferably removable screens 145 whose normal position is such that the discharge ends of the screens are inclined upwardly to a slight extent from the horizontal plane. Grain and short pieces of straw passing through the rack flow from the discharge chute 140 onto the forward portion of the upper screen, a depending baffle 146 mounted at the under side of the plate 134 being disposed beyond the discharge end of the chute 140 to prevent material from being blown or thrown toward the discharge end of the screen.

The cleaning device is suspended through one or more links 147 pivotally attached to the rear portion of the frame 143 and the side walls of the housing and pins 148 on the sides of the frame passing through arcuate slots 149 in the housing and pivotally mounted in bearing portions 150 on the shaking arms or levers 113. As the shaking arms 113 oscillate during operation, this oscillatory or shaking motion is imparted, through the pins 148, to the cleaning device and the screens thereof. Through the shaking motion of the screens, threshed grain passes through one after another of the superposed screens, falling onto the bottom wall of the housing 142, the latter constituting a grain receiving pan having portions sloping downwardly toward the center to a well 152 which constitutes the casing or housing for a transversely extending screw conveyer 153.

Ventilating means are provided for assisting in the separating and cleaning action of the cleaning device. This ventilating or air supplying means includes a fan 156 of conventional form mounted on a shaft 157 and disposed within a casing 158 integral with or carried by the separator housing. The inlet to the fan is in an axial direction, i. e., through the ends of the casing, and the discharge is substantially tangential through a conduit or passage 159 of substantially rectangular cross section discharging into the housing 142 of the cleaning device at the forward ends of the screens. The discharge from the fan is controllable as to volume of air passed therethrough by a valve device disposed in the discharge passage.

This valve device is in the form of two complementary wickets or leaves 162 fixed on operating shafts or spindles 163, 164 adjacent the upper and lower edges of the passage. These wicket valve sections 162 may be of sheet metal suitably secured on their operating shafts, and in closed position they lie in substantially the same plane transversely of the discharge passage, with the space between the meeting edges of the wickets substantially closed, generally as shown in Fig. 13 wherein the wickets are indicated as being in almost fully closed position. These wickets are movable to an open position substantially at right angles to closed position; and in this open position, the wickets are disposed substantially parallel to the upper and lower walls of the discharge passage. The two wickets may be actuated simultaneously to desired position through meshing gear segments 163a and 164a on the shafts 163 and 164 and a suitable common actuating lever.

The adjacent edges of the wickets which substantially meet each other in closed position are of serrated or tooth formation, and the teeth of both wickets are of the same shape and size and with the teeth of one wicket alternating with those of the other wicket. As the wickets move from fully closed position, an opening of extended zigzag formation, indicated at 165 in Fig. 13, is formed, providing for the passage of air over a limited but linearly extended area across the full width of the discharge passage and across almost the full height of this passage; and as the wickets are moved toward fully open position, the effective opening continues to extend across the full width and substantially the full height of the passage.

This arrangement provides that under all partly open conditions of the controlling valve device, air is discharged from the fan to the cleaning device throughout an area extending across the full width of the discharge passage and substantially the full height of the passage, the effect of this arrangement being that there are no adverse effects from eddy currents that might result from ordinary for as of valve control, and the air in the discharge passage beyond the controlling valve readily assumes the condition of a body of air of uniform pressure throughout the full cross section of the discharge portion of the passage, this pressure being dependent upon the degree of valve opening. And the fact that this uniform flow of air is available at any desired pressure, dependent upon the degree of valve opening, insures most beneficial results in the cleaning of the grain.

Features of the hereinabove described apparatus for providing a controllable supply of air for the grain cleaner form subject matter of claims of applicant's divisional application Serial No. 343,128, filed June 29, 1940.

During the operation of the apparatus and under the effect of the shaking motion of the cleaning screens and the current of air discharged by the fan 156 across the screens, dust and dirt are blown away through the discharge from the separator housing, and the clean grain passes through the screens. The larger particles of straw and unthreshed grain heads pass over the rake 166 extending from the rear edge of the upper shaking screen to the discharge from the separator housing. Most of the unthreshed or partly threshed heads are recovered by reason of these heavier particles dropping through the tines of and from the rake into the housing 167 of the screw conveyer 168 having an operating shaft 169, the lighter straw particles and chaff being carried, through the shaking motion and under the influence of the air blast, to the discharge from the separator housing.

As the threshed grain drops through the several superposed screens, the shaking action thereof, in conjunction with the air blast, is effective to carry any grain bearing tailings over the rear edge of the screens whence they drop into the casing of conveyer 168.

The opposite end of the conveyer housing 167 communicates, at the farther side of the separator housing, with the housing 171 of an inclined bucket elevator or conveyer 172, in the form of a flexible belt or chain passing over a driving pulley or sprocket mounted on the end of the shaft 169 of the conveyer 168 and over a sprocket or pulley mounted at the upper end of the elevator housing 171.

The upper end of the elevator housing is provided with a discharge spout 173 which discharges material to the feed inlet 174 of a secondary cleaning device, comprising a longitudinally extending housing 176 in front of the separator housing and inclined downwardly from a horizontal plane towards its discharge end. This housing 176 may be of generally trough like shape with its upper wall removable. This housing is provided with a screen 178 onto which material received from the elevator 171 is discharged. The compartment below the screen and receiving the clean grain is provided with a discharge spout or formation, as indicated at 179, which discharges into a chute 181 mounted on the housing of the threshing cylinder and the end wall of the separator housing, and through which the clean grain passes into the forward end of the separator housing where it is picked up and conveyed by the drag 135 to the cleaning device 141. The compartment above the screen 178 has a discharge spout 182 opening into a chute 183 secured to the upper transverse wall of the cylinder housing, this chute opening into the cylinder housing at a point forwardly of the vertical plane through the axis of rotation of the cylinder and at a point adjacent the forward end of the separating housing, at which point this material is picked up by and subjected to a further threshing action by the threshing bars of the threshing mechanism, this further threshed product being discharged at a point adjacent the forward end wall of the separating housing, and hence insuring a separating action thereon throughout the full length of the separating housing.

The housing 176 of the recleaning device is mounted for vibratory motion to effect a shaking of the material on the recleaning screen. As indicated, the discharge end of this housing is mounted on the upper end of a link 184 which is connected at its lower end to the cylinder housing; and the inlet end of the housing 176 is supported on a link 185 which is pivotally connected at its other end to the cylinder housing. A shaking motion is imparted to the supporting link 185 and the recleaning device supported thereon through a pitman 186 connected to the link 185 and to the upper end of the adjacent shaker arm 113 or the pin 115 associated therewith. The vibratory movement imparted to the housing of the recleaning device and the screen thereof effects the desired further separation of clean grain from heads and small pieces of straw, the downward inclination of the screen and the bottom wall of the housing, in conjunction with the shaking action, being sufficient to cause the material above the screen and the clean grain beneath the screen to move readily toward the discharge end of the recleaning device.

The grain falling into the housing 152 of the conveyer 153 is conveyed by the latter and through an extension 187 of the housing 152, this extension being formed beneath or integral with the inclined bottom wall 188 of the grain receiving bin 16. At its discharge end, this conveyer housing 187 communicates with the lower end of the housing 189 of a bucket or like elevating conveyer 191, the communicating portion of the housing 187, indicated at 190, being disposed at the forward edge of the bin 16 and supported by the bottom of the bin. The body portion of the conveyer housing is arranged within and is supported by the bin. The conveyer 191 is actuated by a driving shaft 192. The upper end of this conveyer housing is provided with a laterally and downwardly extending discharge spout 194.

An adjustable discharge chute 195 may be provided which will permit the discharge of grain from the spout 194 to a wagon or other receptacle outside of the bin 16, as indicated in Figs. 14 and 15, or discharge from the spout to the bin 16, as indicated in dotted outline in Fig. 15. As indicated in Fig. 14, this chute is partially closed at its upper side, the opening in the upper side being only of such size as to permit insertion of the spout 194 and the sliding or tilting movement of the chute to the dotted line position of Fig. 15, as described hereinafter, and the chute is provided at its lower side with a stop or abutment 196. A supporting frame is provided having side arms 198 secured to projections on the discharge spout 194 and carrying a cross bar 199 disposed appreciably below the lower wall of the spout 194. A plurality of bracing arms 201 are carried by the cross bar 199, the lower ends of these bracing arms being mounted on the wall of the bin.

As indicated in Fig. 14, and in full lines in Fig. 15, the discharge chute 195 is held in operative position through engagement of the stop 196 on the chute with the cross bar 199 of the supporting frame, thus preventing longitudinal separation of the chute from the spout, and the weight of the outer portion of the chute maintains the inner end of the bottom wall of the chute against the under side of the discharge spout 194.

The inner end of the chute may be tilted downwardly about the cross bar 199 as a pivot, and the chute then slid to the dotted line position of Fig. 15, this downward sliding motion being limited by engagement of stop 196 with the upper edge of the side wall of the bin, the discharge chute being maintained by its own weight in this operative position wherein material discharged from the spout 194 to the chute may pass directly to the bin.

It may be desirable, particularly where the space between the upper edge of the side wall of the bin and the housing 189 of the elevator is limited, as in the present case, that the discharge chute 195 be considerably wider than the discharge spout 194 of the elevator so that there may be sufficient space for the passage of grain discharged from the spout 194 to the chute when it is in position, as indicated in dotted lines in Fig. 15, to discharge grain to the bin.

The inclined bottom wall 188 of the bin is provided at a point above the horizontal conveyer 153 with a section in the form of a removable valve or closure plate 202 slidable in suitable guides on the bottom wall 188 and operable by rod 203 projecting through the forward side of the bin and connected to an operating lever 204 pivoted to a fixed point on the bin or frame structure. With the closure plate 202 in position to close the opening in the bottom wall 188 of the bin, the conveyer 153 may convey grain to the housing 189 of the conveyer 191, the latter then elevating this grain and discharging the same through the discharge chute 195 to the bin, when the latter is in the dotted line position of Fig. 15. If it is desired to discharge grain from the bin 16 to a wagon at the side of the apparatus, the operating lever 204 is actuated to move the sliding plate 202 to open position, thus providing communication between the bin and the interior of the housing of the conveyer 153. Grain is then conveyed from the bin by the conveyer 153 to the conveyer 191, whence it is discharged through the discharge chute 195, with the latter in the full line position of Figs. 14 and 15, to a point where it may drop into a side wagon.

Power for operating the various mechanisms of the apparatus is derived from a main power shaft made up of longitudinally adjustable sections 206, 207. The forward section 206 is provided with a spherical journal portion 208 rotatably supported in a spherical bearing 209 which is pivotally mounted on the forward end of the draw bar frame 12 to move in a plane extending in the general direction of the axis of the shaft section 206. The shaft section 206 is connected through a double universal connection, comprising universal joints 210 and 212 and an intermediate shaft coupling 213, to the rear end of a power shaft 214 carried by a tractor, not shown, this power shaft preferably being operable at speeds independent of the speed of travel of the tractor.

The connection between shaft sections 206 and 207 is in the form of a combined slip clutch and telescopic connection including a split coupling sleeve comprising forward and rear portions 216 and 217, respectively. The forward section of the coupling is provided on its interior surface with a friction clutch lining 218 adapted, when the clamping bolts 219 are drawn up sufficiently, to cause the lining to frictionally grip the shaft section 206 with a desired pressure, to insure rotation of the coupling sleeve with the shaft section 206 under all conditions of normal load, but permitting slippage of the shaft section 206 with respect to the coupling sleeve when the load on the apparatus, as transmitted through the forward section 206 of the coupling sleeve is above a predetermined normal value.

The sections of the split rear section 217 of the coupling are preferably interiorly machined and are clamped in desired set position by bolts 221 so as to form a socket of rectangular cross section for telescopic driving connection with the correspondingly shaped portion of the shaft section 206 the latter being telescopically slidable within the socket of rectangular cross section.

The shaft section 207 is connected through a universal coupling with the shaft 154 of the horizontal grain conveyer 153, this latter shaft having a suitable bearing in a housing at the lower forward end of the grain bin 16.

With this arrangement of the main power shaft, it is free to accommodate itself, through the combined friction clutch and telescopic joint between its sections, and the pivoted spherical bearing 209 of the shaft section 206, and the several universal couplings, to all relative displacements of the power shaft 214 of the tractor, as the latter moves over uneven ground and makes turning movements of any degree, and the mechanisms of the apparatus, as well as the engine of the tractor, are protected against damage due to the overloads.

A power shaft 223, mounted in a bearing housing 224 supported on the structure of the bin 16 or the supporting frame, is connected through a set of bevel gears, indicated at 225, to the driving shaft 154; and the shaft 223 is provided with a V-groove sheave 226, the latter being connected with a V-groove sheave 227 on the operating shaft 82 of the threshing cylinder, through a V-belt 228, preferably with a suitable idler sheave cooperating with the belt to secure the desired tension thereof. A second V-groove sheave 229 is mounted on the shaft 223 and is connected through a V-belt 231 to a V-pulley 232 on the operating shaft 79 of the upper roller 76 of the feeding conveyer 75, and to a V-pulley 234 mounted on the inner side wall of the header frame, preferably through a suitable idler pulley. The sheave 234 drives a pitman 235, through an eccentric on the sheave, the pitman actuating the sickle device through its connection with the actuating plate 32 and the operating rod 31 of the sickle.

A V-belt pulley 236 on the opposite end of the shaft 79 of the upper roller of the feeding draper 75 drives a V-belt pulley 237 on the shaft 39a of the upper roller 39 of the main conveying draper 38, through a crossed V-belt 238, thus imparting the desired direction of rotation to such draper.

Power is supplied from the rear end of the shaft 154, through a drive, indicated in Fig. 8, including a V-belt 240 cooperating with a V-pulley 241 on the shaft 154, a V-pulley 242 on the shaft 169 of the conveyer 168, a V-pulley 243 on the shaft 157 of the fan 156 and a V-pulley 245 on the driving shaft 136 of the grain drag 135, this driving connection serving to drive the conveyer 168 and the driving pulley or sprocket of the elevating conveyer 172, the fan 156, and the grain drag, all in the desired direction of rotation, with but one crossing turn, indicated at 247, of the belt. An adjustable idler pulley 248 is mounted on the side wall of the separator housing and serves to establish the desired driving tension on the belt 240; and through an operating lever 249 on which the shaft of idler pulley 248 is mounted, the tension of the belt may be adjusted or wholly relieved, as when the apparatus is to be out of operation for some time, or when it is desired to use the elevating conveyer 191 merely for the purpose of emptying the grain bin to a side wagon.

The shaft 136 is provided at each end thereof with an eccentric connection to pitmans 251, one at each side of the separator housing, the other end of these pitmans being connected to the lower ends of the shaker arms 113 which impart the desired shaking movement to the grain rack and the cleaning device 141. The sheave 245 may be used as a portion of one of these eccentric connections to the adjacent pitman 251.

The pitman 186 is connected to the shaker arm 113 at the inner or further side of the separator housing, the other end of this pitman being connected to the link 185 of the secondary cleaning device 176 to impart the desired shaking movement thereto.

The elevating conveyer 191 in the grain bin is driven by a V-pulley or sprocket 254 on the driving shaft 192 of the conveyer and drivingly connected to a corresponding pulley or sprocket 256 on the forward end of the drive shaft 154.

A shaft 257 is mounted in bearings carried by the wall of the storage bin, and a drive, indicated at 258, including pulleys or sprockets on the outer end of the shaft 257 and on the hub of the adjacent traction wheel 11 serves to actuate the shaft 257 at a speed corresponding to the speed of travel of the apparatus over the ground. The inner end of the shaft 257 is provided with a V-pulley 259 connected by a V-belt 260 to a V-pulley 261 on the inner end of the reel shaft 56. Through positioning of the shaft 257 with its axis in, or in close proximity to, alinement with the axis of the shaft 39a (as indicated in Figs. 1 and 2) about which latter axis the header frame 14 and the parts carried thereby have their pivotal up and down movement, with the result that the distance between centers of the shaft 257 and the reel shaft 58 is not appreciably affected by such adjustment of the header frame, and through the extended length and flexibility of this V-belt drive between the shaft 257 and the reel shaft, suitable driving cooperation of the belt 260 with the pulley 261 on the reel shaft is maintained throughout the various positions of adjustment of the reel shaft. And this ground or traction wheel drive of the reel, independently of the sickle and harvesting and separating mechanisms, permits travel of the apparatus through a field at any desired speed over a wide range, with assurance that the reel is always operating at a proportionate and proper speed, while permitting a constant speed, or any desired speeds of operation of the sickle and threshing and separating mechanisms.

The diameters of the various driving and driven pulleys are so selected as to give the desired normal speeds of rotation to the driven shafts. Further adjustment of the speeds of the individual driven shafts may be secured through the use of V-groove pulleys of known design wherein provisions are made for adjusting the width of the space between the side walls of the belt groove, thus permitting the driving belt to sink to variable distances in the groove and thereby providing at will a considerable range of effective pitch diameters of the sheaves.

The matter of facility for adjustment of the speed of the threshing cylinder for different crops is a matter of considerable importance, particularly with a threshing mechanism of the character described hereinabove where the cut grain is fed in a relatively thin stream of a width corresponding to the length of the sickle, for most efficient results in the matter of maximum recovery of clean grain or seed without cracking or damage to the latter are to be secured at different operating speeds for different crops, and often for the same crop under varying conditions of the crop, such as size of stalks and amount of weeds included with the crop.

Features of the harvester-thresher organization as a unit and its actuating mechanisms form subject matter of claims of applicant's divisional application Serial No. 343,126, filed June 29, 1940.

It should be understood that the invention claimed herein is not limited to the exact details of design and construction disclosed, and it is contemplated as including modifications within the scope of the appended claims.

It is claimed and desired to secure by Letters Patent:

1. In a harvester-thresher, a threshing mechanism, a separator mechanism, said separator mechanism extending transversely of the direction of discharge of straw from said threshing mechanism and having a portion thereof disposed along the rear side of said threshing mechanism throughout the greater portion of the length of the latter, said separator mechanism being operative to feed the straw in a direction transverse to the direction of travel of the harvester-thresher during normal operation thereof, and means for guiding straw discharged from said threshing mechanism to cause it to be directed toward the end of said separator mechanism opposite the discharge end thereof.

2. In a harvester-thresher, a threshing mechanism, a separator mechanism including a straw carrying device extending transversely of the direction of discharge of straw from said threshing mechanism and having a portion thereof disposed along the rear side of said threshing mechanism throughout substantially the full length of the latter, said straw carrying device being operative to feed the straw in a direction transverse to the direction of travel of the harvester-thresher during normal operation thereof, a housing for said straw carrying device, and means for guiding straw discharged from said threshing mechanism to cause it to be deflected laterally onto the end of said straw carrying device opposite the discharge end thereof, said guiding means comprising a baffle mounted on a wall of said housing.

3. In a harvester-thresher, a threshing mechanism, a separator mechanism, said separator mechanism including a straw carrying rack extending transversely of the direction of discharge of straw from said threshing mechanism and having a portion thereof disposed along the rear side of said threshing mechanism throughout the greater portion of the length of the latter, said rack being operative to feed the straw in a direction transverse to the direction of travel of the harvester-thresher during normal operation thereof, a housing enclosing the portion of said rack adjacent said threshing mechanism, and means for guiding straw discharged from said threshing mechanism to cause it to be directed toward the end of said rack opposite the discharge end thereof, said guiding means comprising curved baffle plates mounted on a wall of said housing and having their discharge edges directed toward the wall of said housing opposite to the discharge end thereof.

4. In a harvester-thresher, a threshing mechanism, a separator mechanism, said separator mechanism including a straw carrying rack extending transversely of the direction of discharge of straw from said threshing mechanism and having a portion thereof disposed along the rear side of said threshing mechanism throughout substantially the full length of the latter, said rack being operative to feed the straw in a direction transverse to the direction of travel of the harvester-thresher during normal operation thereof, a housing enclosing the portion of said rack adjacent said threshing mechanism, and means for guiding straw discharged from said threshing mechanism to cause it to be directed toward the end of said rack opposite the discharge end thereof, said guiding means comprising a plurality of spaced baffle plates mounted on a portion of the roof of said housing adjacent that side of said threshing mechanism nearest the discharge end of said rack and having their discharge edges directed toward the wall of said housing opposite to the discharge end thereof.

5. In a harvester-thresher, a threshing mechanism, a housing therefor, a separator mechanism, a housing therefor, said separator mechanism including a straw carrying rack extending transversely of the direction of discharge of straw from said threshing mechanism and having a portion thereof disposed along the rear side of said threshing mechanism throughout substantially the full length of the latter and extending laterally past said threshing mechanism, the discharge end of the housing for said threshing mechanism communicating with the housing for said separator mechanism above the rack thereof, and means for guiding straw discharged from said threshing mechanism to cause it to be directed onto the end of said rack opposite the discharge end thereof, said guiding means comprising curved baffle plates mounted on a wall of said housing in the path of material discharged from said threshing mechanism and having their discharge edges directed toward the wall of said housing opposite to the discharge end thereof.

6. In a harvester-thresher, a threshing mechanism, a separator mechanism disposed in the rear of said threshing mechanism throughout substantially the full length thereof and extending transversely of the direction of discharge of material from said threshing mechanism, said separator mechanism being operative to feed material deposited thereon in a direction transverse to the direction of travel of the harvester-thresher during normal operation thereof, and said threshing mechanism having a discharge passage communicating with said separator mechanism at the forward side thereof and adapted to guide material discharged from said threshing mechanism rearwardly and upwardly beyond said threshing mechanism, a deflecting device disposed in the path of material discharged from said threshing mechanism and adapted to deflect said discharged material laterally to cause the same to be deposited on the end portion of said separator mechanism remote from the discharge end thereof.

7. In a harvester-thresher, a threshing mechanism, and a separator in the rear of said threshing mechanism and including an enclosing housing and a separating rack therewithin and extending transversely of the direction of discharge of material from said threshing mechanism, said rack being operative to feed material deposited thereon in a direction transverse to the direction of travel of the harvester-thresher during normal operation thereof, and said threshing mechanism having a discharge passage communicating with the separator housing at the forward side thereof for guiding material discharged from said threshing mechanism rearwardly and upwardly beyond said threshing mechanism toward the roof of the separator housing, and deflecting means within the separator housing, and including a deflecting plate in the path of material discharged from said threshing mechanism, for deflecting said material laterally to cause it to be deposited on that end portion of the separator remote from the discharge end thereof.

8. In a harvester-thresher, a threshing mechanism comprising a rotatable cylinder having circumferentially spaced and longitudinally extending threshing bars at its periphery and a substantially imperforate concave, the rear portion of said concave extending upwardly substantially as high as the axis of said threshing cylinder, and a separator in the rear of said threshing mechanism, said threshing mechanism having a discharge passage communicating with said separator at the forward side thereof and operative through the action of said threshing bars in cooperation with said concave to forcibly discharge threshed material rearwardly and upwardly into said separator to a point rearward of and above said threshing mechanism, said separator including a separating rack device, and means disposed at said point in said separator in the path of material discharged from said threshing mechanism for deflecting said material to cause it to be turned toward and deposited on the end portion of said rack device remote from the discharge end thereof.

9. In a harvester-thresher, a threshing mechanism comprising a rotatable cylinder having circumferentially spaced and longitudinally extending threshing bars at its periphery and a substantially imperforate concave beneath said cylinder, said cylinder being operable through the action of said threshing bars in cooperation with said concave to forcibly discharge threshed grain and straw rearwardly and upwardly past said concave to a point rearward of and above said cylinder, and a separator open at its forward side to receive said material discharged from said threshing mechanism, said separator comprising an enclosing housing, a separating rack therewithin for advancing straw toward the discharge end of the separator, and deflecting means, including a deflecting plate over said rack in the direct path of the material discharged upwardly and rearwardly from said threshing mechanism, for deflecting said material to cause it to be deposited on the end portion of said rack opposite the discharge end thereof.

WALTER R. DRAY.